United States Patent
Freese et al.

(10) Patent No.: US 6,269,627 B1
(45) Date of Patent: *Aug. 7, 2001

(54) RAPID THRUST RESPONSE CONTROL LOGIC FOR SHAFT-DRIVEN LIFT FAN STOVL ENGINE

(75) Inventors: Richard A. Freese, Stuart; Eric T. Meyers, Hobe Sound, both of FL (US)

(73) Assignee: United Technologies Corporation, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/212,908

(22) Filed: Dec. 16, 1998

(51) Int. Cl.[7] .................................................. F02C 9/00
(52) U.S. Cl. ................. 60/39.24; 244/12.3; 244/23 B; 60/235; 60/233
(58) Field of Search ................... 244/12.3, 197, 244/23 B, 53 R; 60/223, 235, 236, 237, 239, 242, 39.24

(56) References Cited

U.S. PATENT DOCUMENTS

| | | | |
|---|---|---|---|
| 4,809,500 | 3/1989 | Roberts, Jr. | .............. 60/235 |
| 4,928,482 | 5/1990 | Pollak et al. | ........... 60/39.161 |
| 4,984,425 | * 1/1991 | Smith . | |
| 5,133,182 | 7/1992 | Marcos | ............... 60/39.161 |
| 5,174,105 | * 12/1992 | Hines . | |
| 5,197,280 | * 3/1993 | Carpenter et al. . | |
| 5,209,428 | * 5/1993 | Bevilaqua et al. . | |
| 5,303,545 | * 4/1994 | Larkin . | |
| 5,345,757 | * 9/1994 | MacLean et al. . | |
| 5,440,490 | * 8/1995 | Summerfield . | |
| 5,454,531 | * 10/1995 | Melkuti . | |
| 5,687,564 | * 11/1997 | Kelly et al. . | |
| 5,752,379 | * 5/1998 | Schafer et al. . | |
| 5,857,321 | * 1/1999 | Rajamani et al. . | |

\* cited by examiner

*Primary Examiner*—Charles T. Jordan
*Assistant Examiner*—Tien Dinh

(57) ABSTRACT

A short take-off and vertical landing ("STOVL") aircraft has a conventional gas turbine engine that is selectively mechanically connected to a vertically-oriented lift fan by a drive shaft when the aircraft operates in a vertical flight mode. An engine control provides for rapid response thrust control of the lift fan and low rotor spool when the pilot initiates desired changes in thrust. The control achieves the rapid thrust response by varying the inlet guide vanes of the lift fan, together with selective fuel flow scheduling. These variations result in a substantially constant low rotor speed, which facilitates the desired rapid thrust response and corresponding aircraft control.

12 Claims, 3 Drawing Sheets

RAPID THRUST RESPONSE CONTROL LOGIC FOR SHAFT-DRIVEN LIFT FAN STOVL ENGINE

CROSS REFERENCE TO RELATED APPLICATION

The subject matter of this application is related to the subject matter of commonly owned U.S. patent application, filed on even date herewith, entitled "Rapid Response Attitude Control Logic for Shaft-Driven Lift Fan STOVL Engine".

TECHNICAL FIELD

This invention relates generally to control of gas turbine engines, and more particularly to thrust control of a gas turbine aircraft engine having a shaft-driven lift fan selectively coupled to the engine for use on a STOVL aircraft.

BACKGROUND ART

Short take-off and vertical landing ("STOVL") military aircraft, also known as vertical and/or short takeoff and landing ("V/STOL", "VTOL", or "STOL") aircraft (hereinafter all of which are referred to as a "STOVL" aircraft for convenience), are used when a single aircraft is needed to attain both horizontal and vertical flight modes. The vertical flight modes comprise aircraft takeoffs and landings from, e.g., aircraft carriers or other limited-length runways. Such aircraft generally include one or more conventional gas turbine engines that power the aircraft in both the horizontal and vertical flight modes.

To achieve the vertical thrust necessary for vertical flight modes, each engine on the STOVL aircraft may be coupled in some manner to one or more auxiliary lift fans. The lift fans may also be used to control the attitude (i.e., pitch, roll, yaw) of the aircraft. The lift fans are typically disposed within the aircraft fuselage separate from the engine. The primary airflow axis of the lift fan is oriented vertically within the aircraft (i.e., the fan exhaust is pointed downward to generate vertical lift), while the primary airflow axis of the engine is oriented in the conventional horizontal direction. However, the engine exhaust is typically adjustable in a well-known manner from a horizontal position for normal horizontal flight to a vertical position for vertical flight modes. This way, the direction of the thrust produced by the engine may also be varied between horizontal and vertical.

The lift fan may be selectively aerodynamically coupled to the fan exhaust or turbine exhaust of the engine, or the lift fan may be selectively mechanically coupled to the fan or low rotor spool of the engine by a rotating drive shaft. In the latter case, a clutch and gearbox mechanism is usually employed to selectively engage and disengage the lift fan with the gas turbine engine. Examples of these types of well-known propulsion systems for STOVL aircraft are given in U.S. Pat. Nos. 5,464,175, 5,312,069, 5,275,356, 5,209,428, which are all hereby incorporated herein by reference.

The conventional thrust response control system for a gas turbine engine consists predominantly of fuel flow scheduling. Increasing or decreasing fuel flow results in a corresponding increase or decrease in the speed of both the high and low rotor spools within the engine. Fuel flow is typically changed in response to pilot-initiated movements of the throttle or power lever. Also, changing fuel flow typically changes the angle of the inlet guide vanes on the fan and compressor as well as the area of the exhaust nozzle (i.e., jet area). By increasing low rotor speed, the fan draws in more airflow and the engine, in turn, generates more thrust.

However, in a STOVL aircraft having a lift fan mechanically coupled by a drive shaft to the engine fan spool and operating in a vertical flight mode, a significant increase in the inertia (i.e., resistance to speed change) of the lift fan and low rotor spool combination results. This is as compared to the inertia of the low rotor spool alone (i.e., without the lift fan coupled to the low rotor spool). The increased inertia causes a corresponding decrease in the thrust response time of the lift fan and low rotor spool combination when the conventional fuel flow scheduling is employed as the thrust response control system. This decreased thrust response could cause the STOVL aircraft to not be able to meet certain aircraft stability, maneuverability and thrust control requirements.

DISCLOSURE OF INVENTION

An object of the present invention is to provide for rapid response thrust control of a gas turbine engine and a shaft-driven lift fan selectively coupled to the engine for use on a STOVL aircraft.

Another object of the present invention is to provide for such rapid response thrust control of the engine and lift fan while minimizing the possibility of engine instability or stall.

A further object of the present invention is to provide for such rapid response thrust control of the engine and lift fan by controlling the movement of existing aircraft components having relatively high response rates.

Yet another object of the present invention is to provide for such rapid response thrust control of the engine and lift fan by keeping constant the engine low rotor speed.

Still another object of the present invention is to provide for such rapid response thrust control of the engine and lift fan without requiring any additional engine variable geometry, actuation or system components.

The present invention is predicated on the fact that rapid response of a coupled combination of the lift fan and engine to a desired thrust change can be achieved by both keeping constant the speed of the low-pressure spool of the engine, and by varying both the fuel flow to the engine and the angle of the lift fan inlet guide vanes.

According to the present invention, a gas turbine engine is selectively mechanically connected to a lift fan by a drive shaft during operation in certain predetermined modes. An engine control is employed having logic that provides for rapid response thrust control of the coupled lift fan and low rotor engine spool when desired changes in thrust are initiated. The logic employed consists of varying the inlet guide vanes of the lift fan to vary the amount of airflow to the lift fan, together with selective fuel flow scheduling to the engine. These variations result in a substantially constant low rotor speed, which facilitates the desired rapid thrust response.

In a preferred exemplary embodiment, both the lift fan and gas turbine engine are utilized on a STOVL aircraft that can attain both horizontal and vertical flight modes. The lift fan is selectively coupled to the engine during vertical flight modes (e.g., takeoffs and landings) of the aircraft. The resulting rapid thrust response provided by the control logic of the present invention allows for corresponding control of the aircraft.

The above and other objects and advantages of the present invention will become more readily apparent when the following description of a best mode embodiment of the present invention is read in conjunction with the accompanying drawings.

BEST MODE FOR CARRYING OUT THE INVENTION

Figure 1:
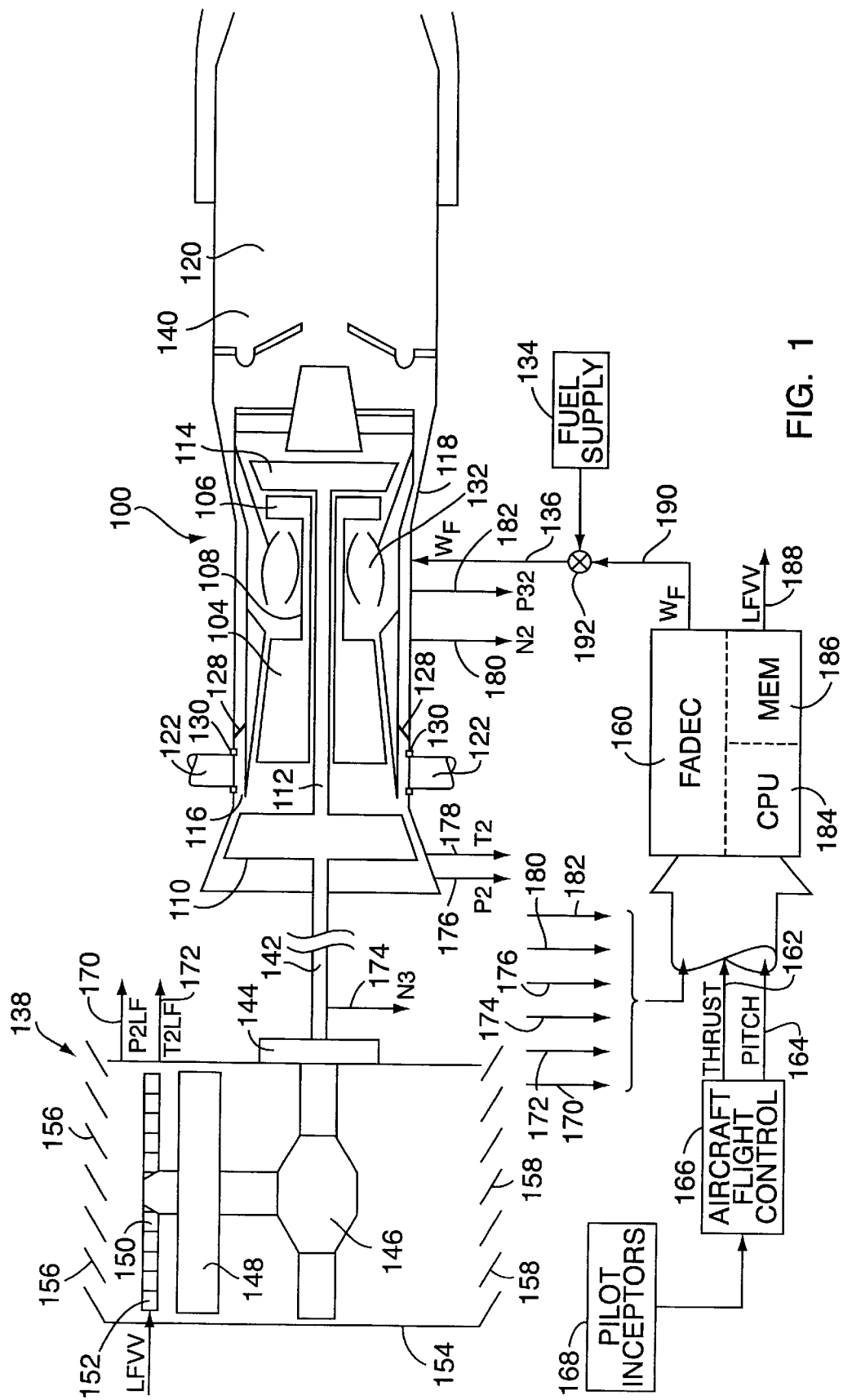
FIG. 1 is a schematic diagram of a gas turbine engine having a shaft-driven lift fan selectively connected thereto, together with a block diagram of an engine control having rapid response thrust control logic implemented therein in accordance with the present invention.
Figure 2:
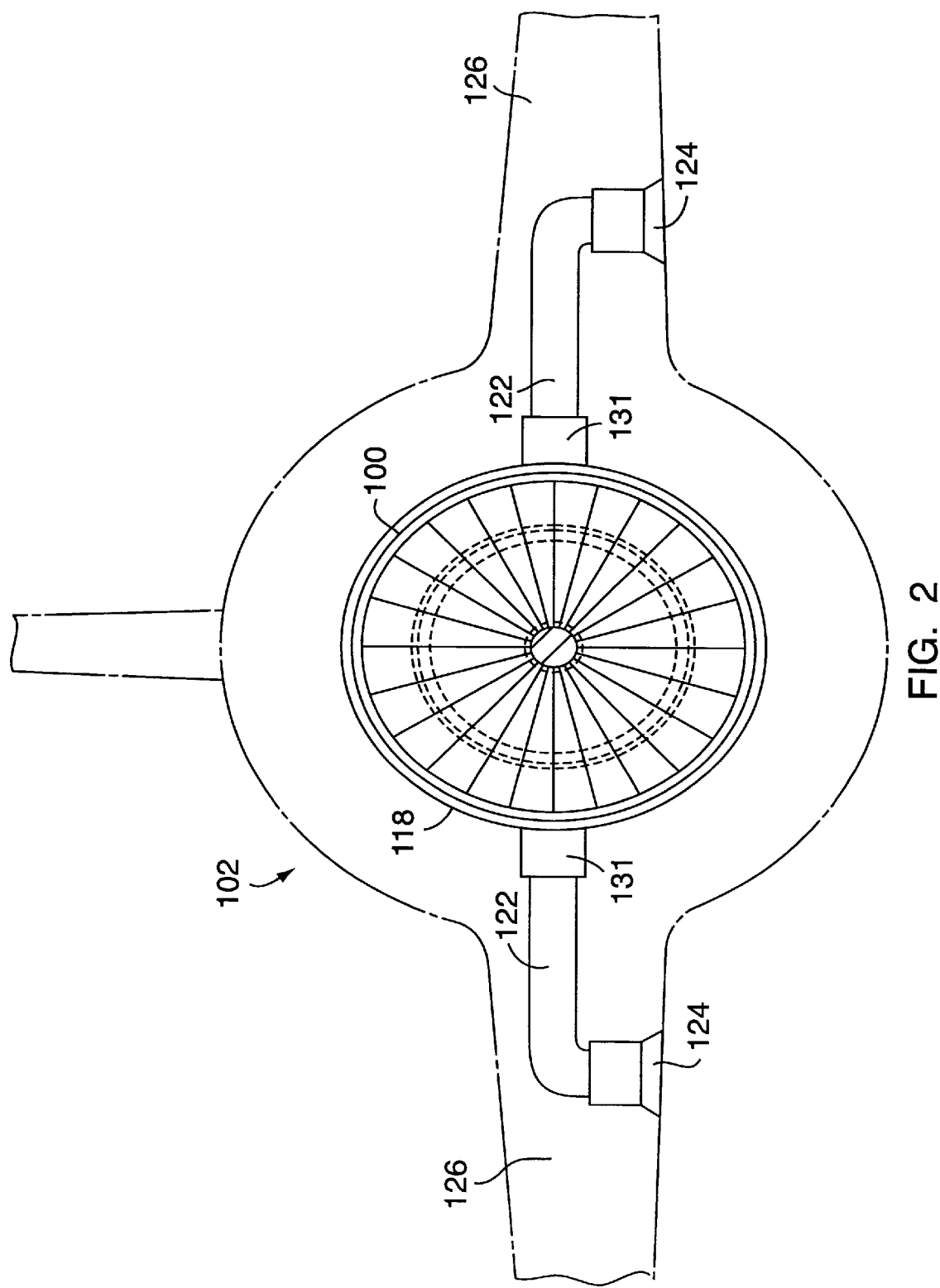
FIG. 2 is a cross section view of a portion of a STOVL aircraft including the gas turbine engine and control of FIG. 1, together with a pair of roll control ducts for controlling the roll attitude of the aircraft.

Referring to FIGS. 1 and 2, there illustrated is a conventional gas turbine engine 100 for use in powering a STOVL military aircraft 102 of the type described and illustrated in the aforementioned U.S. Pat. No. 5,209,428, which has been previously incorporated herein by reference. A cross section of a portion of the STOVL military aircraft 102, as illustrated in FIG. 5 of U.S. Pat. No. 5,209,428, is substantially reproduced as FIG. 2 herein. The engine 100 may comprise the model F119, provided by Pratt & Whitney, a division of United Technologies Corporation, the assignee of the present invention. That jet engine 100 is of the well-known, twin spool, axial flow, fan type, but the invention is not to be limited as such. Other engine types (e.g., single spool) may be utilized within the broadest scope of the present invention.

As illustrated in FIG. 1, the exemplary engine 100 consists of a high-pressure rotor spool having a plurality of high-pressure compressor stages 104. Each high-pressure compressor stage 104 comprises a rotor assembly rotatably driven by a corresponding plurality of high-pressure turbine stages 106 that comprise similar rotor assemblies. As is well known, a compressor or turbine rotor assembly generally consists of a rotating disk having a plurality of blades attached thereto. Associated stator vane assemblies, each comprising a plurality of stationary blades or vanes, may also be included within the compressor and turbine to direct the airflow into the rotor assemblies. A rotatable hollow shaft 108 connects the high-pressure compressor 104 and high-pressure turbine 106 together to form the high-pressure spool.

Similarly, the low-pressure rotor or spool consists of the fan and a plurality of low-pressure compressor stages 110 that comprise rotor assemblies combined together and connected by a rotatable shaft 112 to the low-pressure turbine 114. The shaft 112 of the low-pressure spool is disposed within the hollow shaft 108 of the high-pressure spool. The low-pressure turbine 114 provides power to rotate the fan and low-pressure compressor combination 110.

During normal horizontal flight of the STOVL aircraft 102, the fan 110 discharges a portion of its exhaust through an outer annular passageway 116 disposed next to the engine casing 118 and out toward an engine exhaust nozzle 120 where it combines with the core engine exhaust from the low-pressure turbine 114. Also, the fan and/or low-pressure compressor 110 discharges a portion of its exhaust into the inlet of the high-pressure compressor 104 and eventually out through the engine core to the engine exhaust nozzle 120. As such, the engine operates as a mixed flow engine during horizontal flight. In contrast, during vertical flight, that portion of the fan exhaust may, instead, be directed out through ducts 122 and to the roll control nozzles 124 located within the wings 126 of the aircraft 102 in a known manner to control the roll attitude of the aircraft, as described in greater detail hereinafter with respect to FIG. 2. This is accomplished by closing a plurality of doors 128 disposed in the outer annular passageway 116, together with secondary seals 130 at the entrance to the ducts 122 next to the engine casing 118. FIG. 1 illustrates the doors 128 closed and, thus, the fan exhaust being directed out to the roll ducts 122. Yet, the low-pressure compressor 110 continues to discharge into the inlet of the high-pressure compressor 104 and subsequently to and through the engine core. As such, the engine 100 operates as a separate flow engine while in the vertical flight mode.

A gas generator burner 132, typically of the annular type, is interposed between the outlet of the high-pressure compressor 104 and the inlet of the high-pressure turbine 106. Fuel is controllably provided to the burner 132 from a fuel supply 134 on a line 136. The burner 132 serves to combust the fuel to provide an energized working medium for powering the high- and low-pressure turbines (and, thus the high and low rotor spools along with the lift fan 138, when coupled to the engine 100) and for generating thrust to power the aircraft 102. The exemplary military STOVL aircraft engine 100 may also include an augmentor or afterburner 140, along with the variable jet area nozzle 120.

Also, as is well known for STOVL aircraft 102 (and as described and illustrated in U.S. Pat. No. 5,209,428), the exhaust nozzle 120 may be designed to divert engine exhaust flow horizontally for normal horizontal flight, vertically downward for takeoffs and landings, and into intermediate positions when transitioning between vertical and horizontal flight. Although not illustrated in FIG. 1, it is well known in the art that the exhaust nozzle 120 may include a diverter comprising a plurality of telescoping sections. When in the vertical flight mode, the telescoping sections are extended outward and downward to divert engine exhaust air downward to provide additional vertical upward thrust for the aircraft 102.

Still referring to FIG. 1, the engine 100 is mechanically coupled by a drive shaft 142 to an auxiliary lift fan 138 that is typically disposed forward of the engine 100 in the aircraft 102. The lift fan 138 may be similar to that described and illustrated in U.S. Pat. No. 5,209,428. The drive shaft 142 connects the lift fan 138 to the front of the low rotor spool shaft 112 of the engine 100 through a clutch 144. The clutch 144 selectively connects and disconnects the engine 100 from the lift fan 138 for desired STOVL aircraft operation in vertical and horizontal flight modes, respectively. The lift fan 138 also includes a gearbox/transmission assembly 146 that is coupled at one end to a lift fan rotor 148 and to the drive shaft 142 at the other end via the clutch 144.

The lift fan 138 also includes the lift fan rotor 148. The lift fan rotor 148 is similar to an engine rotor stage described above in that the lift fan rotor comprises, in a preferred exemplary embodiment, two counter-rotating disks each having a plurality of blades attached thereto. Each lift fan rotor disk has a corresponding set of variable inlet guide vanes 150 mounted on top of the associated disk. The vanes 150 are used to adjust the flow of inlet air through the fan rotor 148 to thereby control the power extracted from the lift fan rotor 148. The position of the vanes 150 is typically adjusted through use of suitable known actuators 152, such as a single hydraulic actuator that serves to adjust the vanes 150 for both rotor disks. The position of the vanes 150 is controlled to achieve constant low rotor speed and, thus, rapid response to desired thrust changes, in accordance with the control logic of the present invention, as described in detail hereinafter.

The lift fan 138 includes a vertically oriented duct 154 with an entrance covered by a plurality of moveable doors 156. The doors 156 control the flow of air into the inlet guide vanes 150 of the lift fan 138. Generally, the doors 156 are fully opened during vertical flight modes, and are fully closed during horizontal flight modes. The entrance doors 156 are shown in FIG. 1 in a partially opened position. The lift fan 138 also has an exit covered by a plurality of moveable doors 158. These exit doors 158 are controlled in a similar manner to the entrance doors 156. However, it should be understood that the position of both the entrance and exit doors 156, 158 forms no part of the control logic of the present invention.

Also illustrated in FIG. 1, in block diagram form, is a portion of an engine control 160 having logic that implements the rapid response thrust control of the present invention. The control 160 preferably comprises a full authority digital electronic control ("FADEC") provided by Hamilton Standard, a division of United Technologies Corporation, the assignee of the present invention. Besides implementing the control logic of the present invention, the FADEC control 160 typically carries out other known engine and lift fan control functions, which form no part of the present invention and, thus, are not described herein.

In carrying out the control logic of the present invention, the FADEC control 160 monitors a plurality of engine operating parameters that are input thereto. Two of the input signals, the THRUST request signal on a line 162 and the PITCH request signal on a line 164, are generated by a known aircraft flight control 166, which typically forms no part of the FADEC control 160. The aircraft flight control 166 is responsive to various pilot inceptions 168, such as the throttle or power lever, together with other known pilot-initiated devices such as the control stick and foot pedals. In response, the aircraft flight control 166 provides a requested or desired thrust for the engine 100 and lift fan 138, along with a desired or requested position for the pitch of the STOVL aircraft 102.

Other sensed engine and lift fan parameters that are input to the FADEC control 160 for use in the present invention on corresponding signal lines include the pressure (P2LF on a line 170) and temperature (T2LF on a line 172) at the lift fan inlet, the speed of the drive shaft 142 (N3 on a line 174), the pressure (P2 on a line 176) and temperature (T2 on a line 178) at the engine fan inlet, the speed of the high-pressure engine spool (N2 on a line 180), and the burner pressure (P32 on a line 182). These parameters are sensed by suitable known sensors and are utilized by the FADEC control 160 in implementing the rapid response thrust control logic of the present invention, as described in detail hereinafter with respect to FIG. 3.

Figure 3:
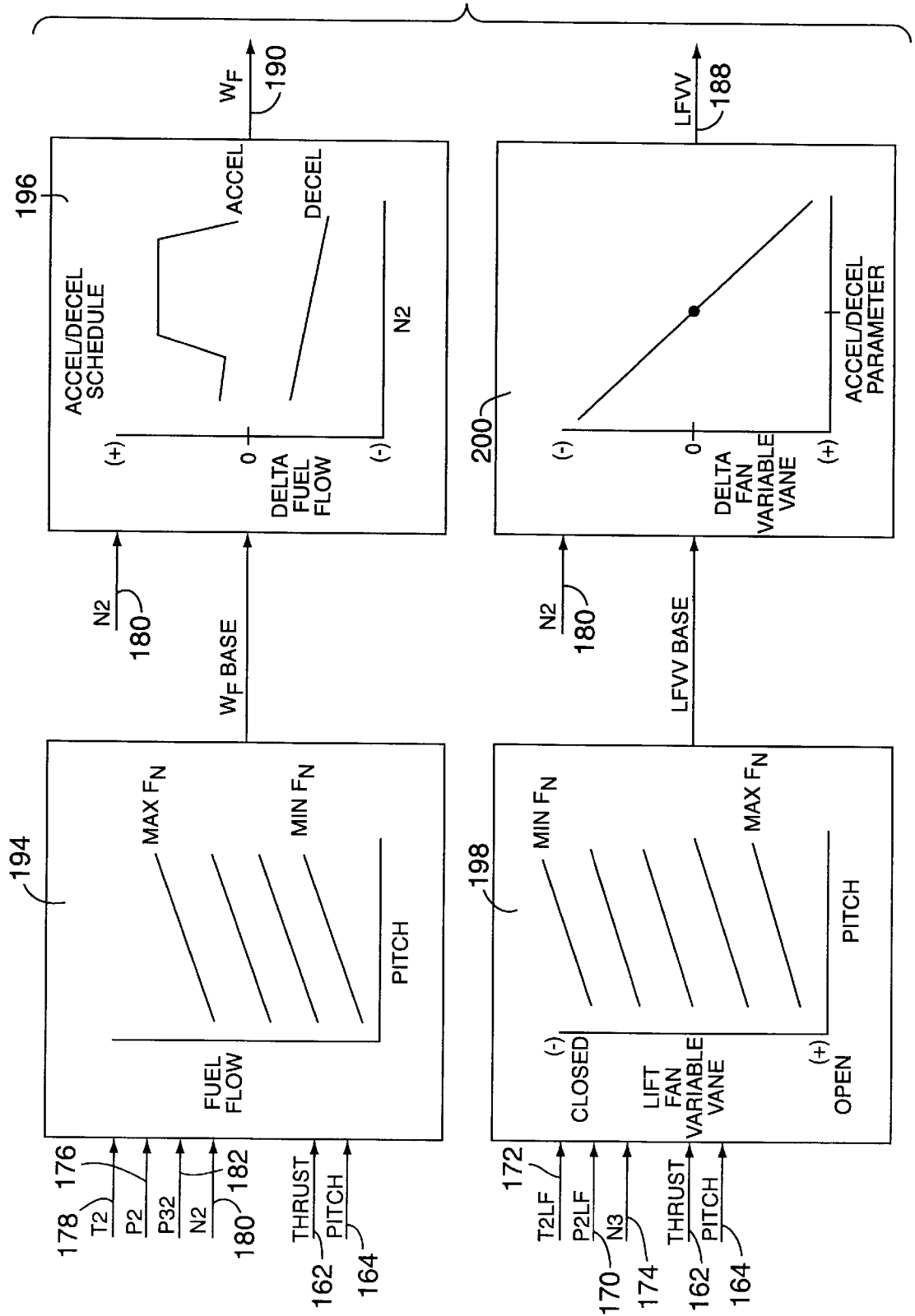
FIG. 3 is a more detailed block diagram of the engine control of FIG. 1 showing the rapid response control logic according to the present invention.

In a preferred exemplary embodiment, the FADEC control 160 comprises a central processing unit ("CPU") 184 for executing software instructions that carry out the control functions for the engine, including those that embody the control logic of the present invention. This control logic includes schedules or function generators for various engine operating parameters, as shown in FIG. 3. The CPU 184 may comprise a commercially available microprocessor. The FADEC control 160 also comprises memory 186 for storing the software instructions, along with various data, including calculations. The FADEC control 160 outputs a control signal, LFVV, on a line 188 to the actuator 152 for the lift fan variable vanes 150. The FADEC control 160 also outputs a control signal, WF, on a line 190 to a valve 192 that controls the amount of fuel from the fuel supply 134 provided to the burner 132. The control logic that generates these signals is described in detail hereinafter in FIG. 3 with respect a preferred exemplary embodiment of the present invention.

Referring also to FIG. 2, there illustrated in cross section is a portion of the STOVL aircraft 102 having the FADEC control of FIG. 1 implemented therein. As mentioned herein before, FIG. 2 is essentially a reproduction of FIG. 5 of U.S. Pat. No. 5,209,428. Left and right roll control ducts 122 are connected through the engine casing 118 and to the outer annular passageway 116 downstream of the fan exhaust and upstream of the plurality of doors 128. These ducts 122 extend outward within the corresponding aircraft wings 126 and terminate in left and right downward directed variable cross-sectional area roll control nozzles 124. Also provided are the control valves 131 that control the flow into the ducts 122, while the nozzles 124 control the rate of airflow for roll control of the aircraft 102. Fan exhaust air is selectively directed through the ducts 122 and vertically downward and out the nozzles 124 to generate variable lifting forces that control the roll attitude of the STOVL aircraft 102.

Referring now to FIG. 3, there illustrated in detail is the control logic implemented as software instructions stored in the memory portion 186 of the FADEC control 160 and executed by the CPU portion 184 of the FADEC control 160. The control logic generally comprises schedules or function generators that schedule a commanded fuel flow (WF) for the engine burner 132, together with a commanded position (LFVV) for the lift fan variable vanes 150, based on a number of sensed and commanded engine parameters. The result of the commanded WF and LFVV signals, generated according to the present invention, is to generate additional exhaust nozzle thrust and balanced lift fan thrust while keeping the speed of the fan or low-pressure compressor rotor 110 essentially constant. With such a constant rotor speed, it has been proven experimentally that the desired rapid thrust response of the lift fan 138 coupled to the engine 100 is achieved, and that reduction in thrust response due to the inertial resistance of the combined lift fan and engine is overcome.

In FIG. 3 a first function generator 194 schedules a base fuel flow (WF BASE) as a function of the commanded aircraft thrust and pitch, along with various measured engine parameters (e.g., T2, P2, P32 and N2). The schedule 194 comprises a graph of fuel flow as a function of commanded pitch. The various measured engine parameters are utilized in a known manner when calculating fuel flow and pitch. Indicated on the graph are a number of lines of requested thrust (FN). As seen in this graph, a base fuel schedule is generated dependent upon the requested thrust and pitch.

The base fuel flow (WF BASE) output from the first function generator 194 is input to a second function generator 196 that serves to both modify the base fuel flow (WF BASE) for thrust acceleration/deceleration and to limit the maximum and minimum commanded fuel flow values as a function of the corrected speed of the high-pressure rotor of the engine (N2). The output of the second function generator 196 is the commanded fuel flow (WF) provided on the signal line 190 to the fuel flow valve 192 (FIG. 1).

Also in FIG. 3, a third function generator 198 schedules a base value for the position of the lift fan inlet vanes 150

(LFVV BASE) as a function of the commanded aircraft thrust and pitch, along with various measured engine operating parameters (e.g., T2LF, P2LF and N3). Similar to the first function generator or schedule 194, the schedule 198 comprises a graph containing a number of lines of thrust (FN). As seen in this schedule 198, a base LFW schedule is generated dependent upon the requested thrust and pitch.

The base lift fan inlet guide vane position (LFVV BASE) output from the third function generator 198 is input to a fourth function generator 200. This schedule 200 serves to modify the LFVV based on the amount of change of an acceleration/deceleration parameter such as rate of change of thrust request or N2. The output of this fourth schedule 200 comprised the commanded lift van inlet guide vane position signal (LFVV) on the signal line. This signal serves to adjust the position of those vanes 150 to achieve substantially constant low rotor speed and, thus, rapid response to desired changes in thrust.

The control logic of the present invention has been described and illustrated herein for use with a gas turbine engine 100 having a lift fan 138 selectively coupled to the engine by means of a direct mechanical connection. However, the invention is not limited as such. Instead, the control logic of the present invention is independent of the type of connection employed between the lift fan and the engine. For example, the control logic of the present invention may be utilized with a lift fan that is aerodynamically coupled to the engine.

Also, the present invention is not limited for use with gas turbine engines solely used for aircraft. Instead, the broadest scope of the present invention contemplates use of the control logic for land-based gas turbine engines as well. Further, the present invention is not limited for use with a gas turbine engine selectively coupled to a lift fan. Instead, the broadest scope of the present invention contemplates its use with other relatively high inertia devices that may be selectively or permanently coupled to the gas turbine engine. The control logic of the present invention has utility for use in providing rapid power response for these various alternative combinations.

The control logic of the present invention has been described and illustrated herein in a preferred exemplary embodiment as being implemented in software executed by a computer processor 184 located in a digital electronic engine control 160. However, instead the invention may be embodied entirely in electronic hardware, either digital and/or analog, or in a combination of hardware and software. In the alternative, the invention may be embodied in a hydro-mechanical control, an electromechanical control, or the like. Such alternative ways of embodying the control logic of the present invention should be readily apparent to one of ordinary skill in the art in light of the teachings herein.

Although the present invention has been shown and described with respect to the detailed embodiments thereof, it will be understood by those skilled in the art that various other changes in the form and detail thereof may be made without departing from the broadest scope of the claimed invention. It suffices for the broadest scope of the present invention that a control for a gas turbine engine 100 selectively connected to a lift fan 138 when operating in certain predetermined modes provides for rapid response thrust control of the lift fan and low rotor spool when a desired change in thrust is initiated. The control achieves the rapid thrust response by varying the inlet guide vanes of the lift fan, together with selective fuel flow scheduling. These variations result in a substantially constant low rotor speed, which facilitates the desired rapid thrust response.

Having thus described the invention, what is claimed is:

1. A control system for a gas turbine engine selectively coupled to a device during operation in a predetermined operating mode of an apparatus embodying the gas turbine engine and the device, the gas turbine engine having a burner with fuel being controllably provided thereto, the gas turbine engine also having a compressor and a turbine connected together in a spool, the device having airflow passing therethrough in a controlled manner, the control system comprising:

means for sensing a parameter indicative of a corresponding operating condition of the engine and for providing a sensed engine signal indicative thereof;

means for sensing a parameter indicative of a corresponding operating condition of the device and for providing a sensed device signal indicative thereof;

means, responsive to a desired change in an amount of thrust to be provided for by the engine and the device selectively coupled to the engine during operation in the predetermined operating mode of the apparatus, for providing a desired thrust signal indicative of the desired change in the amount of thrust; and signal processing means, responsive to the sensed engine signal and to the sensed device signal and to the desired thrust signal, for controlling the amount of fuel provided to the engine and for controlling the amount of airflow passing through the device, wherein the amount of fuel provided to the engine and the amount of airflow passing through the device are both in an amount to keep substantially constant a speed of the compressor and turbine spool, wherein by keeping substantially constant the speed of the compressor and turbine spool the control system provides for relatively rapid response of the engine and device selectively coupled together during operation in the predetermined operating mode of the apparatus to the desired change in the amount of thrust.

2. The control system of claim 1, wherein the device is a lift fan having a plurality of inlet guide vanes, and wherein the signal processing means comprises means for controlling an angle of the inlet guide vanes to thereby control the amount of airflow passing through the lift fan, the amount of airflow passing through the lift fan is in an amount to keep substantially constant the speed of the compressor and turbine spool.

3. The control system of claim 1, wherein the apparatus embodying the gas turbine engine and the device is an aircraft capable of being operated in both horizontal and vertical flight operating modes, and wherein the predetermined operating mode of the apparatus is a vertical flight mode of the aircraft, wherein the device is a lift fan having a plurality of inlet guide vanes, and wherein the signal processing means comprises means for controlling the amount of airflow passing through the lift fan, the amount of airflow passing through the lift fan is in an amount to keep substantially constant the speed of the compressor and turbine spool.

4. The control system of claim 3, wherein the signal processing means comprises means for controlling the amount of airflow passing through the lift fan by controlling an angle of the plurality of inlet guide vanes.

5. The control system of claim 1, wherein the signal processing means further comprises means for controlling the amount of fuel provided to the engine based on a predetermined schedule of a base amount of engine fuel flow as a function of a commanded thrust of the engine.

6. The control system of claim 1, wherein the signal processing means further comprises means for controlling the amount of airflow passing through the device based on a predetermined schedule of a position of the device as a function of a commanded thrust of the engine.

7. The control system of claim 1, wherein the means for sensing a parameter indicative of a corresponding operating condition of the engine and for providing a sensed engine signal indicative thereof further comprises means for sensing at least one temperature of the engine and for providing at least one corresponding sensed temperature signal indicative thereof, for sensing at least one pressure of the engine and for providing at least one corresponding sensed pressure signal indicative thereof, and for sensing at least one speed of the engine and for providing at least one corresponding sensed speed signal indicative thereof, and wherein the signal processing means is responsive to the at least one sensed temperature signal and is responsive to the at least one sensed pressure signal and is responsive to the at least one sensed speed signal for controlling the amount of fuel provided to the engine.

8. The control system of claim 1, wherein the means for sensing a parameter indicative of a corresponding operating condition of the device and for providing a sensed device signal indicative thereof further comprises means for sensing at least one temperature of the device and for providing at least one corresponding sensed temperature signal indicative thereof, and for sensing at least one pressure of the device and for providing at least one corresponding sensed pressure signal indicative thereof, and wherein the signal processing means is responsive to the at least one sensed temperature signal and is responsive to the at least one sensed pressure signal for controlling the amount of airflow passing through the device.

9. A control system for an aircraft selectively operable in a vertical mode of flight and having a gas turbine engine and a lift fan and a control system, the gas turbine engine being selectively coupled to the lift fan during the vertical mode of flight, the gas turbine engine having a burner with fuel being controllably provided thereto, the gas turbine engine also having a compressor and a turbine connected together in a spool, the lift fan having airflow passing therethrough in a controlled manner, the control system comprising:

first processing means, responsive to a signal indicative of an engine operating parameter and responsive to a signal indicative of a lift fan operating parameter and responsive to a signal indicative of a commanded thrust output of the engine, for controlling the amount of fuel provided to the engine; and second processing means, responsive to a signal indicative of an engine operating parameter and responsive to a signal indicative of a lift fan operating parameter and responsive to a signal indicative of a commanded thrust output of the engine, for controlling the amount of airflow passing through the lift fan;

wherein the amount of fuel provided to the engine and the amount of airflow passing through the lift fan are both in an amount to keep substantially constant a speed of the compressor and turbine spool;

wherein by keeping substantially constant the speed of the compressor and turbine spool the control system provides for relatively rapid response of the engine and lift selectively coupled together during vertical flight of the aircraft to the commanded thrust output of the engine.

10. The control system of claim 9, wherein the lift fan has a plurality of inlet guide vanes operable to control an amount of airflow directed into an inlet of the lift fan, and wherein the second signal processing means comprises for controlling the amount of airflow passing through the lift fan by controlling the angle of the plurality of inlet guide vanes.

11. The control system of claim 9, wherein the first processing means further comprises means for controlling the amount of fuel provided to the engine based on a predetermined schedule of a base amount of engine fuel flow as a function of a commanded thrust of the engine.

12. The control system of claim 9, wherein the second processing means further comprises means for controlling the amount of airflow passing through the lift fan based on a predetermined schedule of a position of the lift fan as a function of a commanded thrust of the engine.

* * * * *